United States Patent [19]
Kaburagi

[11] Patent Number: 6,107,781
[45] Date of Patent: Aug. 22, 2000

[54] POWER SUPPLY UNIT FOR SUPPLYING ELECTRIC POWER TO AN ELECTRONIC APPARATUS, AND SYSTEM COMPRISING THE POWER SUPPLY UNIT AND THE ELECTRONIC APPARATUS

[75] Inventor: Yoshiaki Kaburagi, Kawasaki, Japan

[73] Assignee: Canon Kabushiki Kaisha, Tokyo, Japan

[21] Appl. No.: 09/219,600

[22] Filed: Dec. 23, 1998

[30] Foreign Application Priority Data

Dec. 26, 1997 [JP] Japan .................................... 9-360234
Dec. 25, 1998 [JP] Japan .................................. 10-370244

[51] Int. Cl.$^7$ ................................................. H01M 10/46
[52] U.S. Cl. ............................................................ 320/135
[58] Field of Search .................................... 320/114, 125, 320/127, 132, 134, 135, 136

[56] References Cited

U.S. PATENT DOCUMENTS 3,599,071 8/1971 Iapuyade ................................. 320/150
3,864,617 2/1975 Smith et al. ............................. 320/159
4,641,042 2/1987 Yoshiaki ................................... 307/66

*Primary Examiner*—Edward H. Tso
*Attorney, Agent, or Firm*—Fitzpatrick, Cella, Harper & Scinto

[57] ABSTRACT

In a battery-driven system comprising an electronic apparatus as a main unit and a power supply unit which incorporates a battery (cells) and supplies source power for working the main unit, the present invention intends to achieve more efficient use of the battery. A discharge switch for turning on/off an output of the battery supplied to the side of the main unit is incorporated in the power supply unit. In response to turn-on of a switch provided on the main unit side or a signal from an MPU (control unit) on the main unit side, supply of the source power from the power supply unit to the main unit is controlled to turn on/off.

29 Claims, 3 Drawing Sheets

POWER SUPPLY UNIT FOR SUPPLYING ELECTRIC POWER TO AN ELECTRONIC APPARATUS, AND SYSTEM COMPRISING THE POWER SUPPLY UNIT AND THE ELECTRONIC APPARATUS

BACKGROUND OF THE INVENTION

1. Field of the Invention

The present invention relates to a power supply unit for supplying electric power to an electronic apparatus connected to the power supply unit, and a system comprising the power supply unit and the electronic apparatus.

More particularly, the present invention relates to a power supply unit which is connected to an electronic apparatus such as a recording apparatus, incorporates a battery or cells, and can selectively effect supply and cutoff of power to the electronic apparatus. The present invention also relates to a system comprising the power supply unit and the electronic apparatus.

2. Description of the Related Art

Recently, a variety of carrying-type electronic apparatuses such as portable personal computers, cellular phones, video cameras and portable printers have been put into the market. Those electronic apparatuses are usable without cords in order that users can carry the apparatuses and operate them any places. Therefore, those electronic apparatuses are constructed to be capable of operating with a battery or cells incorporated therein without being connected to domestic power sources through power cords.

In these days, the so-called secondary cells, which can be recharged repeatedly, have been employed as power sources for many of those electronic apparatuses. Known examples of the secondary cells are nickel cadmium cells, nickel hydrogen cells, lithium ion cells, etc.

When the secondary cells are employed as power sources of those electronic apparatuses, it is not usual that the power source comprises a single cell. Generally, a plurality of cells are combined in series or parallel and housed in a case to construct a dedicated battery pack which is incorporated in or connected to the electronic apparatus.

Of the secondary cells, lithium ion cells are advantageous in having a higher energy density per predetermined unit of volume and a higher energy density per predetermined unit of weight than other secondary cells such as nickel cadmium cells and nickel hydrogen cells. In the case of using lithium ion cells, it is known to incorporate a protection circuit in a battery pack for increasing safety of the cells against overcharge or supply of overvoltage.

FIG. 3 is a circuit block diagram of a conventional battery-driven system comprising a power supply unit which incorporates a battery (cells) therein to supply electric power, and a main unit which operates with the power supplied as a drive source from the power supply unit. In FIG. 3, reference numeral 10 on the left side denotes a battery pack constituting the power supply unit. Three lithium ion cells 11 are housed in the battery pack 10 and connected in series. Also, a discharge switch 12 and a charge switch 13 are provided in the battery pack 10. As shown in FIG. 3, the discharge switch 12 and the charge switch 13 are disposed in a current path through which the cells are charged and discharged, and are connected in series. Additionally, the battery pack 10 is provided with output terminals V and E for outputting the power. The battery pack 10 further includes a protection circuit for maintaining safety of the cells. The protection circuit functions such that if there occurs any situation affecting safety of the cells, such as overdischarge, overcurrent, overvoltage or overcharge, the discharge switch 12 and the charge switch 13 are turned off by a control circuit 14 to cut off the power outputted across the output terminals V-E.

Reference numeral 20 on the right side of FIG. 3 denotes the main unit working with the battery pack 10 used as a power supply for the work. The power supplied from the battery pack 10 is applied to a DC—DC converter 22 through an FET (Field Effect Transistor) 21 for conversion into a source voltage Vcc adapted for logics. The main unit 20 comprises a microprocessor (MPU) 23, a ROM 24 for storing a control program used for control executed by the MPU 23, and a RAM 25 serving as a work area for execution of the control program. The operation of the entire main unit 20 is controlled by the MPU 23.

The main unit 20 includes a power switch 26 for selectively turning on/off the source power. The power switch 26 comprises, for example, a tactile switch. A gate of the FET 21 is controlled to close or open upon the power switch 26 being turned on/off. An on/off state of the source power of the main unit 20 is controlled corresponding to control of the gate of the FET 21. An output signal from the power switch 26 is read into the MPU 23 through an input port 27, while the on/off state of the FET 21 is controlled in response to an output signal from an output port 28 through a transistor 30. When the source power of the main unit 20 is turned off, the output from the battery is perfectly cut off and the battery is prevented from discharging.

However, the conventional battery-driven system thus constructed has experienced the following problems.

The FET 21 serving as a switch for turning on/off the source power of the main unit 20 is inserted in a power line in series. Looking from the battery side, therefore, FETs are inserted double in the power line because the discharge switch 12 and the charge switch 13 incorporated in the battery pack 10 each usually comprise an FET and the FET 21 is provided in the main unit 20. With such a construction, resistance developed at the time of turning on the FETs is increased and ineffective Joule heat is generated. Also, an increase of the resistance produces a voltage drop, thus resulting in a reduction of battery efficiency and shortening of battery life.

The above problem becomes more important when a recording apparatus requiring a larger current is used as the main unit 20 which is connected to the battery pack 10. In thermal printers and ink jet printers which require a relatively large current, particularly, in ink jet printers wherein ink is ejected by heat generated by heaters, shortening of battery life leads to a remarkable reduction of operating time per charge, thus resulting in a critical problem.

Another problem in the conventional battery-driven system having the above-described construction is that it has been difficult to reduce the apparatus size and cut down the cost because the FET 21 or the like must be provided as a switch on the side of the main unit 20.

SUMMARY OF THE INVENTION

The present invention has been made with the view of solving the problems set forth above, and an object of the present invention is to provide a power supply unit and a system comprising the power supply unit and an electronic apparatus, with which a battery can be used with higher efficiency.

Another object of the present invention is to provide a power supply unit and a system comprising the power supply unit and an electronic apparatus, with which a reduction in both size and cost can be realized.

To achieve the above objects, a power supply unit according to the present invention is constructed as follows.

The power supply unit according to the present invention resides in a power supply unit for supplying electric power to an electronic apparatus connected to the power supply unit, the power supply unit comprising a battery, an output terminal for outputting output power of the battery to the electronic apparatus, a switch for selectively turning on/off the output power supplied from the battery to the electronic apparatus, a control circuit for controlling changeover of the switch, and a control signal line electrically connected to the electronic apparatus through a control terminal for receiving a signal corresponding to an operation made on the electronic apparatus, the control circuit changing over the switch in accordance with the signal received through the control signal line corresponding to an operation made on the electronic apparatus.

Preferably, upon the control signal line being connected to the ground from a condition in which the control signal line is pulled up by the output power of the battery, the control circuit changes over the switch so that the output power of the battery is outputted to the output terminal.

Also, to achieve the above objects, a system according to the present invention is constructed as follows.

The system according to the present invention resides in a system made up of a power supply unit for supplying electric power and an electronic apparatus operating with the power supplied from the power supply unit, the power supply unit comprising a battery, an output terminal for outputting output power of the battery to the electronic apparatus, a switch for selectively turning on/off the output power supplied from the battery to the electronic apparatus, a control circuit for controlling changeover of the switch, and a control signal line connected to the control circuit, the electronic apparatus including a power switch electrically connected to the control signal line in the power supply unit, the power switch being operated by an operator, the control circuit changing over the switch in accordance with a state of a signal transmitted through the control signal line corresponding to an operation of the power switch, thereby controlling supply of the output power from the battery to the electronic apparatus.

In the above system, preferably, one end of the power switch is connected to the ground, and the control circuit changes over the switch to turn on when the control signal line is transited upon the operation of the power switch to a low level from a condition in which the control signal line is held at a high level by the output power of the battery.

In the above system, preferably, the power switch provided on the electronic apparatus is a switch turned on when depressed by the operator, the control signal line in the power supply unit is transited to a low-level state upon the power switch being depressed in a condition in which the control signal line is held in a high-level state by the output power of the battery, and the control circuit changes over the switch to allow supply of the output power of the battery to the output terminal when the control signal line is in the low-level state.

DESCRIPTION OF THE PREFERRED EMBODIMENTS

An embodiment of the present invention will be described below in detail with reference to the drawings.

Figure 1:
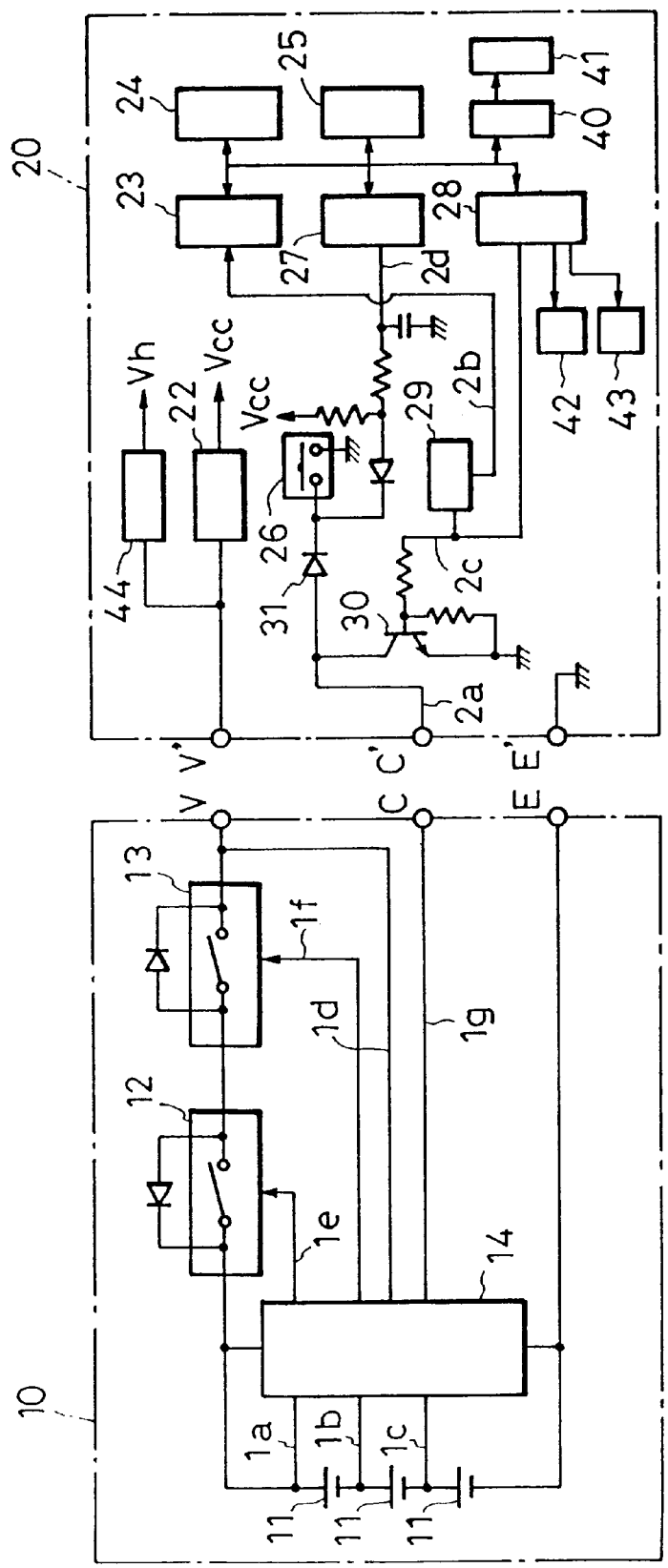
FIG. 1 is a circuit block diagram showing a principal construction of a system comprising an ink jet recording apparatus and a battery pack as a power supply unit, and a manner of connecting them.

FIG. 1 is a circuit block diagram showing a construction of a battery-driven system comprising a battery pack as a power supply unit and an electronic apparatus connected to the battery pack. Note that this embodiment will be described in connection with an ink jet recording apparatus which is connected as one example of electronic apparatus to the battery pack. The ink jet recording apparatus is constructed to be capable of operating with the battery pack used as a power supply for the operation. Also, FIG. 1 illustrates only a principal part of the system construction that is essential for describing the present invention.

In FIG. 1, a block demarcated by a one-dot chain line on the left side denotes a battery pack 10. A block demarcated by a one-dot chain line on the right side denotes an ink jet recording apparatus 20 operating with source power supplied from the battery pack 10. The battery pack 10 and the ink jet recording apparatus 20 can be constructed separately and electrically connected to each other through external terminals provided on them. As an alternative, the battery pack 10 and the ink jet recording apparatus 20 may be installed in one housing and electrically connected to each other in the housing. Further, the battery pack 10 may be installed in a space within the ink jet recording apparatus 20 and electrically connected to the latter in such an internal space of the apparatus 20.

The internal construction of the battery pack 10 will be first described in detail.

The battery pack 10 employs a lithium ion cell 11 as a unit cell of an entire battery. Three lithium ion cells 11 are incorporated in the battery pack 10 and connected in series.

A discharge switch 12 and a charge switch 13, each comprising an FET or the like, are connected in series in an electrical path through which the cells 11 are charged and discharged. One signal line leading from the charge switch 13 is connected to an output terminal V of the battery pack 10. When the cells 11 are discharged, the discharge switch 12 and the charge switch 13 are both turned on so that a current is supplied through a path made up of a plus (+) terminal of the lithium ion cells 11, the discharge switch 12, the charge switch 13 and the output terminal V of the battery pack 10 in this order.

When the cells 11 are charged, the discharge switch 12 and the charge switch 13 are also both turned on. In this case, however, a current for charging the cells is supplied from a charging circuit (not shown), which is prepared outside the battery pack 10, through a path made up of the output terminal V of the battery pack 10, the charge switch 13, the discharge switch 12, and the plus (+) terminal of the lithium ion cells 11 in this order.

The discharge switch 12 and the charge switch 13 are controlled by a control circuit 14. As shown, terminal signals 1a–1c from the respective plus (+) terminals of the lithium ion cells 11 and an output signal 1d of the battery pack 10 are inputted to the control circuit 14. Based on the input signals, the control circuit 14 determines a state of overdischarge or overcurrent, and controls the switches 12, 13 in accordance with a result of the determination.

More specifically, if even one of the output voltages of the cells is below a prescribed voltage, the control circuit 14 determines that an overdischarge state has occurred. Also, if a potential difference between the discharge switch 12 and the charge switch 13 exceeds a prescribed voltage, the control circuit 14 determines that an overcurrent state has occurred. In the event of the battery pack being determined to be in the overdischarge or overcurrent state, the control circuit 14 sets a discharge switch control signal 1e to a high level and cuts off the discharge path, thereby securing safety of the cells 11.

If even one of the output voltages of the cells exceeds a prescribed voltage, the control circuit 14 determines that an overcharge state has occurred. In the event of the battery pack being determined to be in the overcharge state, the control circuit 14 sets a charge switch control signal 1f to a high level and cuts off the charge path, thereby securing safety of the cells 11.

Further, in the construction of this embodiment, a signal line for applying a charge/discharge switch control signal 1g is connected at one end to the control circuit 14. The other end of the signal line for the control signal 1g is connected to an external terminal C of the battery pack 10 so that the control circuit 14 can turn on/off the charge switch 12 and the discharge switch 13 in accordance with control made from the side of the ink jet recording apparatus (main unit) 20 which is connected to the battery pack 10.

The internal construction of the main unit 20 will be next described in detail.

The illustrated system comprises the battery pack 10 as the power supply unit, and the ink jet recording apparatus 20 as the main unit. In this embodiment, the ink jet recording apparatus 20 is employed as one example of an electronic apparatus. Thus, an ink jet recording system is made up of the battery pack 10 and the ink jet recording apparatus 20.

The output terminal V (charge/discharge terminal) of the battery pack 10 is connected to a power source terminal V' of the main unit 20, and a negative contact terminal E of the battery pack 10 is connected to a GND terminal E' of the main unit 20. Also, the control signal output terminal C connected to the signal line 1g used for control of the charge switch 12 and the discharge switch 13 is connected to a power on/off control terminal C' of the main unit 20.

The power outputted from the battery pack 10 is applied to the power source terminal V' of the main unit 20. The battery output applied to the main unit 20 is converted into a logic voltage Vcc for the main unit 20 by a DC—DC converter 22 which is provided in the main unit 20. Also, the main unit 20 includes a microprocessor (MPU) 23 as control means for controlling the main unit 20. Further, a ROM 24 for storing a control program used for control executed by the MPU 23 and a RAM 25 serving as a work area memory are provided in the main unit 20.

A power switch 26 is provided in the main unit 20, and an output signal produced from the power switch 26 is read by the MPU 23 through an input port 27. An output signal 2c from an output port 28 controls an on/off state of a transistor 30.

A recording head 41 is driven by a recording head control circuit 40. A paper feed motor 42, a carriage motor 43, etc. are driven by respective signals issued from the output port 28. Source power Vh for driving the recording head 41, the paper feed motor 42, the carriage motor 43, etc. is supplied from a DC—DC converter 44. The DC—DC converter 44 is connected to the power source terminal V' separately from the above-mentioned DC—DC converter 22 to generate a different voltage from that generated by the DC—DC converter 22.

With the construction shown in FIG. 1, the output of the battery pack 10 is turned on/off in response to turn-on/off of the power switch 26. This switching operation will now be described in detail with reference to FIG. 2.

Figure 2:
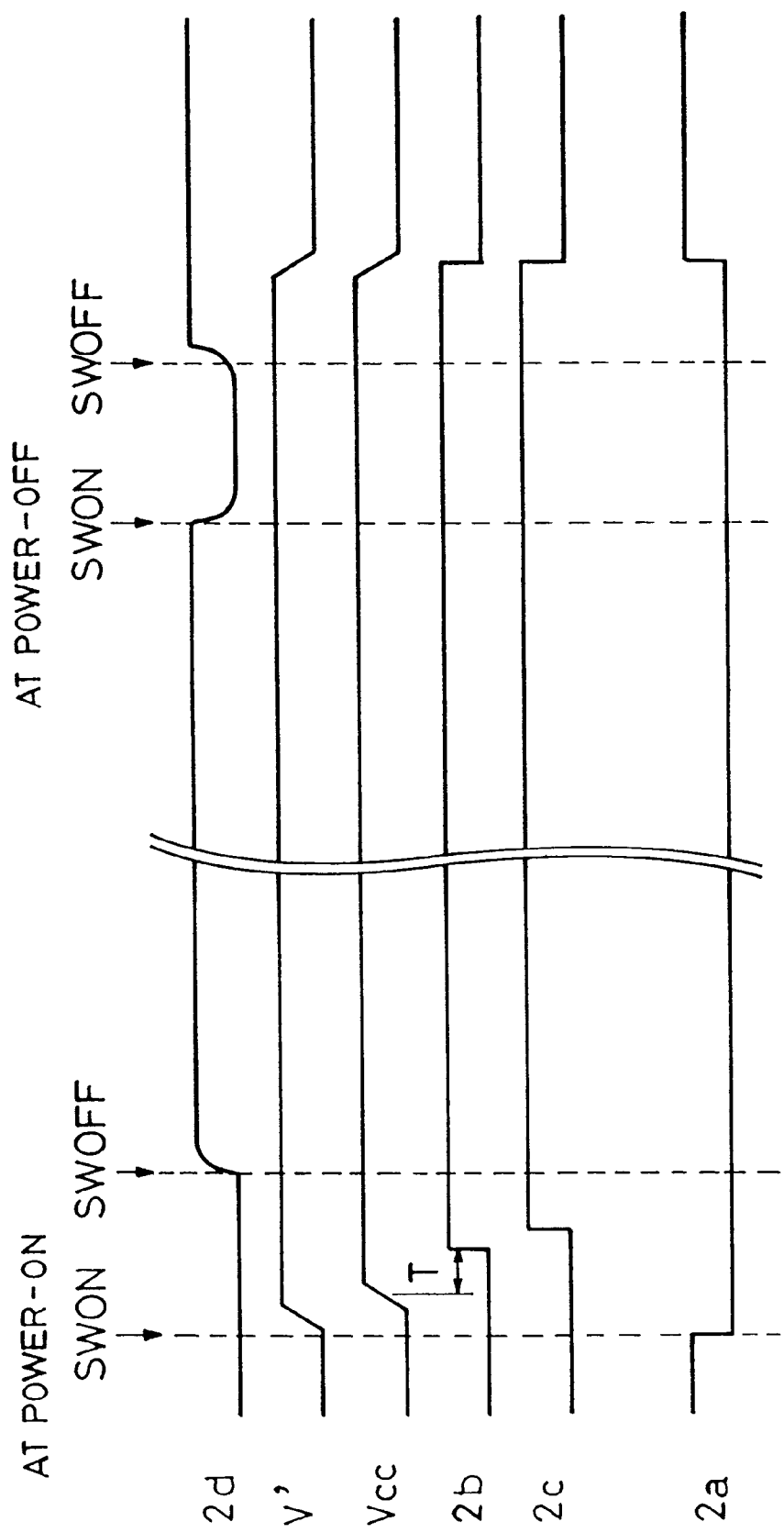
FIG. 2 is a timing chart showing level transition of main signals generated in the construction of FIG. 1.
Figure 3:
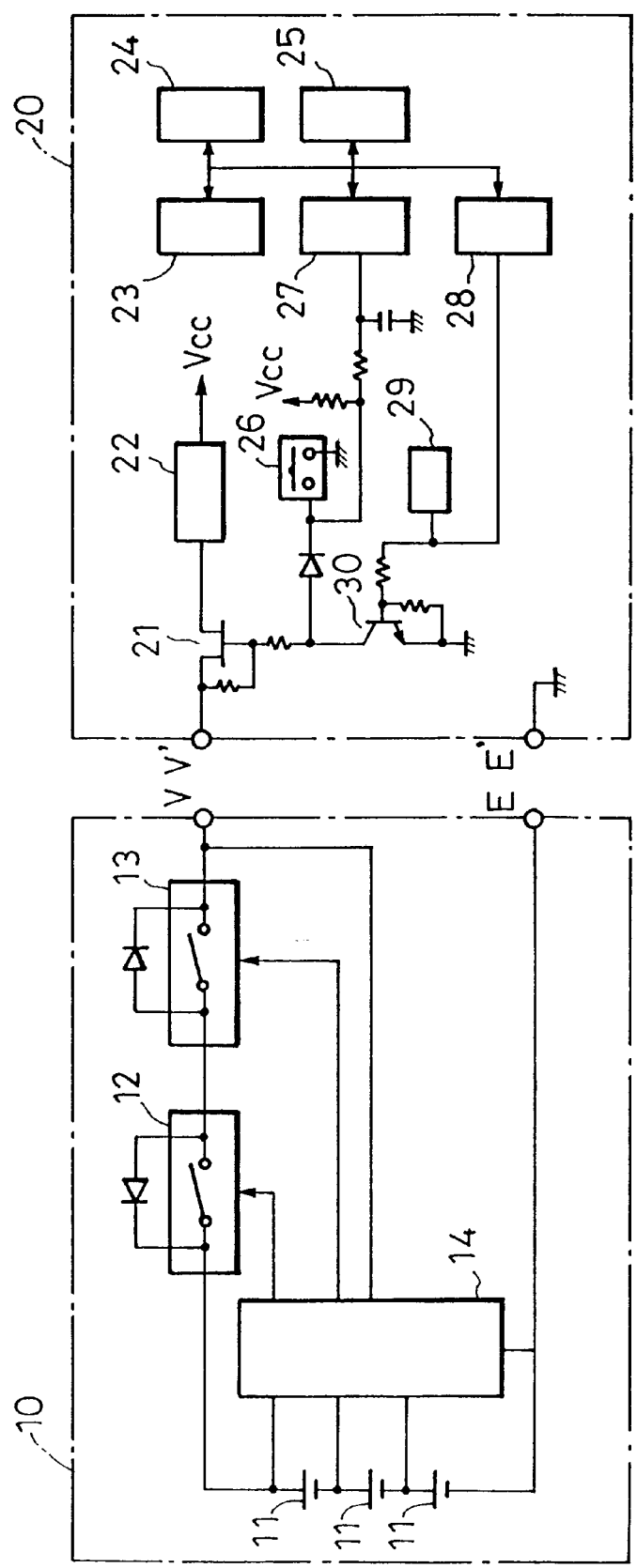
FIG. 3 a circuit block diagram showing a construction of a conventional system comprising a power supply unit and a main unit.

FIG. 2 is a timing chart showing level transition of main signals generated in the construction of FIG. 1.

First, the circuit operation will be described which is carried out in a period from the power switch 26 being depressed to start supply of the source power to the side of the main unit 20 from the condition where the output of the battery pack 10 is cut off, until power-on of the main unit 20.

While the output of the battery pack 10 is kept cut off, a charge/discharge switch control signal 2a, i.e., a signal applied to a signal line 2a through the signal line 1g, is pulled up to the battery voltage by the control circuit 14. When the power switch 26 in the main unit 20 is turned on in such a condition, a current flows through a path made up of the signal line 1g, the signal line 2a, the diode 31, the power switch 26 and the ground in this order because one terminal of the power switch 26 is connected to the ground. Here, the control circuit 14 is designed to turn on the charge switch 12 and the discharge switch 13 in response to the current flowing into the main unit 20 from the signal line 1g. When the charge switch 12 and the discharge switch 13 are both turned on, a current is supplied through a path made up of a plus (+) terminal of the lithium ion cells 11, the discharge switch 12, the charge switch 13, the output terminal V of the battery pack 10, the power source terminal V' of the main unit 20 and the DC—DC converter 22 in this order, thus causing the logic voltage Vcc for the main unit 20 to rise.

When the logic voltage Vcc exceeds a certain level, a reset circuit 29 holds a reset signal 2b at a low level for a prescribed time T to perform the reset operation of the MPU 23. After the reset operation, the MPU 23 starts control of the main unit 20 in accordance with the control program stored in the ROM 24. During a period of initial control in accordance with the control program stored in the ROM 24, the output signal 2c from the output port 28 is controlled to transit to a high level, whereby the transistor 30 is turned on. With the turn-on of the transistor 30, the charge/discharge switch control signal 2a, i.e., the signal through the signal line 1g, is kept fixed to a low level even after the power switch 26 is released. As a result, a condition of the battery pack 10 supplying the source power to the main unit 20 is maintained, and the main unit 20 is held in an operated state.

Incidentally, since a power switch output signal 2d is separated from the charge/discharge switch control signal 2a by a diode 31, the signal 2d rises to a high level in accordance with the time constant of a filter made up of a resistance and a capacitor, after the power switch 26 has been released.

Next, the circuit operation will be described which is carried out in a period from the power switch 26 being depressed to cut off supply of the source power to the side of the main unit 20 from the condition where the power is outputted from the battery pack 10, until power-off of the main unit 20.

In the condition of the battery pack 10 supplying the source power to the main unit 20, the charge/discharge switch control signal 2a is kept fixed to a low level because the transistor 30 is held turned on in response to the output signal 2c from the output port 28. When the power switch 26 is depressed and then released in the above condition, the power switch output signal 2d is issued in the form of a pulse as shown in FIG. 2. Also, the power switch output signal 2d is applied in the form of such a pulse to the input port 27.

Upon detecting the depression of the power switch 26 in response to the pulse signal 2d applied to the input port 27, the MPU 23 executes the operation for protecting the recording head 41 of the ink jet recording apparatus 20. The operation for protecting the recording head 41 is well known in the art of ink jet recording apparatus. In this embodiment, the capping operation is performed to prevent a failure of ink ejection due to drying of ejection orifices formed in the recording head. More specifically, under the control of the MPU 23, the carriage motor 43 is driven to move the recording head 41 to a capping position (not shown) and to cap ejection orifice surfaces of the recording head by a cap member (not shown). After the above capping operation, the MPU 23 shifts to a power-off sequence.

In the power-off sequence, the MPU 23 first transits the output signal from the output port 28 to a low level. Upon the output signal changing to a low level, the transistor 30 is brought into an off state, whereupon the charge switch 12 and the discharge switch 13 are both turned off. Accordingly, the output of the source power from the battery pack 10 is cut off.

When the output of the source power from the battery pack 10 is cut off and the battery output is lowered, the logic voltage Vcc in the main unit 20, which is provided as the output of the DC—DC converter 22, is also lowered correspondingly. Upon the logic voltage Vcc lowering down below a certain level, the output signals 2b, 2c of the reset circuit 29 transit to a low level. As a result, the output signal from the output port 28 is avoided from becoming unstable, and a malfunction of the transistor 30 is prevented.

Thus, with this embodiment, a control terminal for controlling the switches, which are incorporated in the battery pack 10 and turn on/off the battery output, is provided on the battery pack 10, and those switches in the battery pack 10 can be controlled from the side of the main unit 20 in response to a trigger signal from the power switch which is provided in the main unit 20 to turn on/off the source power of the main unit 20.

(Other Embodiments)

While the battery pack comprises, by way of example, lithium ion cells in the above embodiment, it may comprise any other type of cells (or battery) than lithium ion cells. Also, while the power switch comprises, by way of example, a tactile switch, it may comprise any other type of switch such as a slide switch.

Further, while the main unit 20 is described as an ink jet recording apparatus, by way of example, in the above embodiment, the present invention is not limited to the construction described above as the embodiment, and the main unit may comprise any suitable one of various electronic apparatuses.

According to the present invention, as described above, since a switch for turning on/off an output of source power supplied to a main unit is incorporated in a battery pack, i.e., a battery unit (power supply unit), which contains cells as a power source for operating the main unit, and control means for controlling turn-on/off of that switch is provided on the side of the main unit, a switch for cutting off the battery output, which comprises an FET or the like and is inserted in series in a power supply line on the side of the main unit, is no longer required. Therefore, the present invention can provide advantages of realizing more efficient use of a battery and prolonging the battery life.

Further, since the number of parts provided on the side of the main unit and requiring power is cut down, it is possible to achieve a reduction in both unit size and cost.

What is claimed is:

1. A power supply unit for supplying electric power to an electronic apparatus, comprising:

a battery, an output terminal for outputting output power of said battery to said electronic apparatus, a switch for selectively turning on/off the output power supplied from said battery to said electronic apparatus, a control circuit for controlling changeover of said switch, and a control signal line electrically connected to said electronic apparatus through a control terminal for receiving a signal corresponding to an operation made on said electronic apparatus, wherein said control circuit changes over said switch in accordance with the signal received through said control signal line corresponding to an operation made on said electronic apparatus.

2. The power supply unit according to claim 1, wherein upon said control signal line being connected to ground from a condition in which said control signal line is pulled up by the output power of said battery, said control circuit changes over said switch so that the output power of said battery is outputted to said output terminal.

3. The power supply unit according to claim 1, wherein said control circuit changes over said switch to turn off upon detecting abnormality of said battery.

4. The power supply unit according to claim 3, wherein said battery is a rechargeable battery, and said control circuit changes over said switch to turn off upon detecting overcharge of said battery.

5. The power supply unit according to claim 3, wherein said control circuit changes over said switch to turn off upon detecting overvoltage of said battery.

6. The power supply unit according to claim 1, wherein said battery is a rechargeable battery.

7. The power supply unit according to claim 6, wherein said battery is a lithium ion battery.

8. A system made up of a power supply unit for supplying electric power and an electronic apparatus working with the power supplied from said power supply unit, said power supply unit comprising a battery, an output terminal for outputting output power of said battery to said electronic apparatus, a switch for selectively turning on/off the output power supplied from said battery to said electronic apparatus, a control circuit for controlling changeover of said switch, and a control signal line connected to said control circuit, said electronic apparatus including a power switch electrically connected to said control signal line in said power supply unit, wherein said control circuit changes over said switch in accordance with a state of a signal transmitted through said control signal line corresponding to an operation of said power switch, thereby controlling supply of the output power from said battery to said electronic apparatus.

9. The system according to claim 8, wherein one end of said power switch is connected to ground, and said control circuit changes over said switch to turn on when said control signal line is transited upon the operation of said power switch to a low level from a condition in which said control signal line is held at a high level by the output power of said battery.

10. The system according to claim 9, wherein said control signal line is pulled up by the output power of said battery and is held in a high-level state.

11. The system according to claim 9, wherein said control circuit holds said control signal line at a high-level state by the output power of said battery when said switch is in an off-state, and changes over said switch from the off-state to an on-state when said control signal line is transited to a low level upon said control signal line being connected to the ground.

12. The system according to claim 8, wherein said power switch provided on said electronic apparatus is turned on when depressed by the operator.

13. The system according to claim 12, wherein said power switch is a tactile switch.

14. The system according to claim 12, wherein said power switch is electrically connected to said control signal line in said power supply unit, and said control signal line is connected to the ground upon said power switch being turned on.

15. The system according to claim 8, wherein said electronic apparatus includes control means, and said control means executes a reset operation upon transition from a condition in which supply of the power from said power supply unit is cut off, to a condition in which supply of the power from said power supply unit is allowed.

16. The system according to claim 8, wherein said power switch provided on said electronic apparatus is a switch turned on when depressed by the operator, said control signal line in said power supply unit is transited to a low-level state upon said power switch being depressed in a condition in which said control signal line is held in a high-level state by the output power of said battery, and said control circuit changes over said switch to allow supply of the output power of said battery to said output terminal when said control signal line is in the low-level state.

17. The system according to claim 16, wherein said control signal line is pulled up by the output power of said battery and is held in the high-level state.

18. The system according to claim 16, wherein said electronic apparatus further includes control means for controlling an operation of said electronic apparatus, and said control means makes control to hold said control signal line in the low-level state while said control means is supplied with the power from said power supply unit.

19. The system according to claim 18, wherein said electronic apparatus further includes an output portion electrically connected to said control signal line, and said control means controls said output portion so that said control signal line is held in the low-level state, when said electronic apparatus is supplied with the power from said power supply unit.

20. The system according to claim 18, wherein said electronic apparatus further includes detecting means for detecting that said power switch is depressed in a condition in which said electronic apparatus is supplied with the power from said power supply unit, and said control means makes control to transit said control signal line to the high-level state in response to detection made by said detecting means.

21. The system according to claim 20, wherein said electronic apparatus further includes an output portion electrically connected to said control signal line, and said control means controls said output portion in response to detection made by said detecting means so that said control signal line is transited to the high-level state.

22. The system according to claim 20, wherein said control means makes control to execute a predetermined operation required for turning off source power of said electronic apparatus prior to start of the operation for transiting said control signal line from the low-level state to the high-level state.

23. The system according to claim 20, wherein said electronic apparatus further includes an input portion for receiving a signal which is generated upon said power switch being depressed to turn on, and said detecting means detects the depression of said power switch in response to reception of the signal by said input portion.

24. The system according to claim 8, wherein said power supply unit is mounted in said electronic apparatus.

25. The system according to claim 8, wherein said power supply unit is capable of being attached to an external connecting portion of said electronic apparatus.

26. The system according to claim 8, wherein said power supply unit supplies the power to said electronic apparatus in a condition in which said power supply unit is externally electrically connected to said electronic apparatus.

27. The system according to claim 8, wherein said electronic apparatus is a recording apparatus for recording data on a recording medium.

28. The system according to claim 27, wherein said electronic apparatus is an ink jet recording apparatus for recording data by ejecting ink.

29. The system according to claim 28, wherein said electronic apparatus is an ink jet recording apparatus utilizing thermal energy to eject ink.

* * * * *